US008565614B2

(12) United States Patent
Ridgway

(10) Patent No.: US 8,565,614 B2
(45) Date of Patent: Oct. 22, 2013

(54) SPECTRALLY EFFICIENT DIGITAL DATA TRANSMISSION UTILIZING PHASE ENCODED MMW

(75) Inventor: Richard W. Ridgway, Westerville, OH (US)

(73) Assignee: Battelle Memorial Institute, Columbus, OH (US)

( * ) Notice: Subject to any disclaimer, the term of this patent is extended or adjusted under 35 U.S.C. 154(b) by 352 days.

(21) Appl. No.: 12/989,975

(22) PCT Filed: May 1, 2009

(86) PCT No.: PCT/US2009/042532
§ 371 (c)(1),
(2), (4) Date: Oct. 28, 2010

(87) PCT Pub. No.: WO2009/135132
PCT Pub. Date: Nov. 5, 2009

(65) Prior Publication Data
US 201Related40U.S1ApplicationDataa1

(60) Provisional application No. 61/049,488, filed on May 1, 2008.

(51) Int. Cl.
*H04B 10/04* (2011.01)

(52) U.S. Cl.
USPC ........... 398/183; 398/188; 398/198; 398/115; 398/201; 725/125; 725/127; 725/129; 725/67; 359/245; 359/279; 359/325; 359/248; 385/1; 385/2; 385/3; 385/14

(58) Field of Classification Search
USPC ......... 398/115, 116, 117, 183, 188, 192, 118, 398/76, 66, 67, 68, 72, 91, 193, 194, 198, 398/200, 201; 725/105, 106, 125, 127, 129, 725/67; 359/245, 237, 238, 248, 279, 276, 359/325; 385/1, 2, 3, 14, 31, 11, 15, 24, 37
See application file for complete search history.

(56) References Cited

U.S. PATENT DOCUMENTS 5,710,651 A * 1/1998 Logan, Jr. ................. 398/168
6,111,678 A * 8/2000 Mathoorasing et al. ...... 398/147

(Continued)

FOREIGN PATENT DOCUMENTS

EP 0 825 733 A2 2/1998

OTHER PUBLICATIONS

Kawanishi et al., "Millimeter-wave generation and baseband modulation by using reciprocating optical modulation for radio-on-fiber systems in V-band", International Topical Meeting on Microwave Photonics, Sep. 10-12, 2003.

(Continued)

*Primary Examiner* — Hanh Phan
(74) *Attorney, Agent, or Firm* — Dinsmore & Shohl LLP

(57) ABSTRACT

A digital data transmission device is provided comprising optical waveguide architecture, a sideband generator, a modulation controller, an optical filter, a data mapping unit, and a phase controller. The optical waveguide architecture is configured to direct an optical signal through the sideband generator and the optical filter. The sideband generator comprises an electrooptic interferometer comprising first and second waveguide arms. The modulation controller is configured to generate an electrical drive signal to drive the sideband generator at a control voltage that is substantially larger than $V\pi$ to generate optical frequency sidebands about a carrier frequency of the optical signal. The optical filter is configured to discriminate between the optical frequency sidebands and the optical carrier frequency such that optical sidebands of interest can be directed through the optical waveguide architecture as an optical millimeter wave signal. The data mapping unit is configured to generate an encoded data signal representing a digital data input received by the data mapping unit. The phase controller is configured to alter the phase of the electrical drive signal in response to the encoded data signal generated by the data mapping unit. The sideband generator is configured such that encoded alterations in the phase of the electrical drive signal are manifested as encoded alterations in the phase of the optical millimeter wave signal, creating an encoded representation of the digital data input in the optical millimeter wave signal. Methods of transmitting digital data are also provided.

18 Claims, 2 Drawing Sheets

(56) References Cited

U.S. PATENT DOCUMENTS

Figure 1:
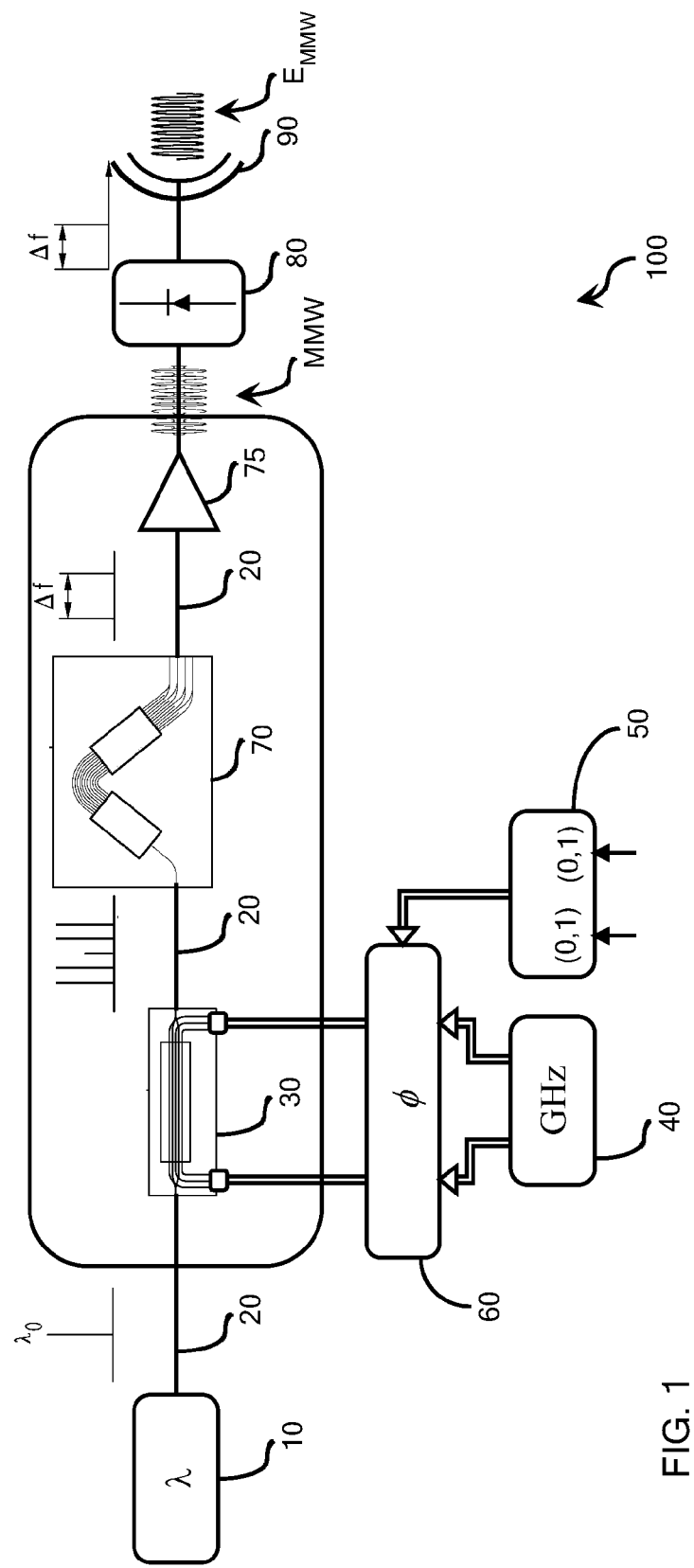

2002/0171900 A1    11/2002   Ono et al.
2008/0279559 A1*   11/2008   Yu et al. .................. 398/118
2009/0067843 A1*   3/2009   Way et al. .................. 398/79

OTHER PUBLICATIONS

International Search Report and Written Opinion for PCT/US2009/042532 dated Jul. 23, 2009.

* cited by examiner

SPECTRALLY EFFICIENT DIGITAL DATA TRANSMISSION UTILIZING PHASE ENCODED MMW

CROSS-REFERENCE TO RELATED APPLICATIONS

This application is a U.S. national phase entry of International Application No. PCT/US2009/042532, filed May 1, 2009, which claims the benefit of U.S. Provisional Application Ser. No. 61/049,488, filed May 1, 2008.

The present disclosure relates to optical devices and, more specifically, to optical devices that are configured to generate high frequency optical signals that can be encoded with data and converted to an electrical data signal.

By way of illustration, not limitation, there is a growing interest in the generation and modulation of high frequency signals. For example, the present inventors have contemplated that signals in the THz spectrum (0.1 to 10 THz) may find significant utility in imaging and wireless applications. For imaging, the THz spectrum may provide high resolution imaging through walls, cargo containers, and other visible barriers. It is contemplated that modulation onto these high frequency signals can provide improved resolution and the ability to separate a desired target from clutter. For wireless data communications, it is contemplated that the THz spectrum may allow ultra high data transfer (10 Gb/s) for transmission of uncompressed high definition television channels. However, significant design challenges face those who endeavor to design systems for the generation and modulation of coherent THz and other high frequency signals.

For example, millimeter-wave carrier frequencies (30 GHz to 300 GHz) provide a promising approach for achieving high data rates. Commercial millimeter-wave systems operating at 70 GHz have demonstrated data links at rates of 1 Gb/s. These data rates are not as high as would be expected at this carrier frequency because millimeter-wave sources cannot be directly modulated and instead the modulation occurs at a lower intermediate frequency. The data rate is limited to 10 percent on the intermediate frequency (typically 11 GHz) to about 1 Gb/s.

Optical approaches for generating and modulating millimeter-wave signals, such as those presented in published patent application US 2008/0199124 A1, carry out modulation on an optical carrier, which can easily handle data rates in excess of 10 Gb/s. To date, these optical approaches have used on-off keying modulation schemes. However, on-off key modulation is not spectrally efficient and consumes a bandwidth of about 1 Hz for each bit/second of data rate. For example, 10 Gb/s wireless data rates for millimeter-wave carriers around 100 GHz typically occupy a bandwidth of 10 GHz.

The present disclosure relates to the use of an electrooptic modulator to provide phase modulation onto a millimeter-wave carrier in an effort to increase spectral efficiency of digital data transmission. The phase of the microwave drive signal driving an overdriven electrooptic modulator will influence the phase of the generated sidebands formed on either side of an optical carrier signal. After removing the unwanted sidebands using an optical filter, the remaining optical signal will contain a phase-modulated millimeter-wave signal on the optical carrier. A high speed photodiode can be used to remove the optical carrier and leave the phase modulated millimeter-wave signal. Phase modulation techniques, such as quadrature phase shift keying, can be shown to be spectrally efficient, with a spectrally efficiency of 2, i.e., 1 Hz of bandwidth will contain 2 b/s of data. Higher order phase modulation can provide even more spectral efficiency.

In addition to controlling the phase of the millimeter-wave signal, the electrooptic modulator can control the amplitude of the millimeter-wave signal. If amplitude and phase can be controlled, then Quadrature Amplitude Modulation (QAM) can be realized, which has even higher spectral efficiency. The present disclosure shows that a photonic approach to generating and modulating millimeter-waves can be used to control both the amplitude and phase of the millimeter wave. This will lead to the ability to provide high-order phase modulation and QAM, both of which are spectrally efficient. A spectrally efficient modulation scheme will consume less bandwidth than a standard on-off keying modulation approach.

A typical rule of thumb suggests that a carrier frequency can employ 10 percent of its bandwidth for data. In other words, a 10 GHz carrier can be used to transmit data at 1 Gb/s and a 100 GHz carrier can be used to transmit data at 10 Gb/s. Spectral efficient coding allows more bits to fit within the allowable bandwidth. As an example, quadrature-phase shift keying (QPSK), which has a spectral efficiency of 2 bits/second per hertz, can encode 20 Gb/s within the 10 GHz bandwidth. More efficient coding methods, such as quadrature amplitude modulation (QAM), can provide higher data rates within the same bandwidth.

In accordance with one embodiment of the present disclosure, a digital data transmission device is provided comprising optical waveguide architecture, a sideband generator, a modulation controller, an optical filter, a data mapping unit, and a phase controller. The optical waveguide architecture is configured to direct an optical signal through the sideband generator and the optical filter. The sideband generator comprises an electrooptic interferometer comprising first and second waveguide arms. The modulation controller is configured to generate an electrical drive signal to drive the sideband generator at a control voltage that is substantially larger than $V_\pi$ to generate optical frequency sidebands about a carrier frequency of the optical signal. The optical filter is configured to discriminate between the optical frequency sidebands and the optical carrier frequency such that optical sidebands of interest can be directed through the optical waveguide architecture as an optical millimeter wave signal. The data mapping unit is configured to generate an encoded data signal representing a digital data input received by the data mapping unit. The phase controller is configured to alter the phase of the electrical drive signal in response to the encoded data signal generated by the data mapping unit. The sideband generator is configured such that encoded alterations in the phase of the electrical drive signal are manifested as encoded alterations in the phase of the optical millimeter wave signal, creating an encoded representation of the digital data input in the optical millimeter wave signal.

In accordance with another embodiment of the present disclosure, a method of transmitting digital data is provided. According to the method, an optical signal is directed through a sideband generator comprising an electrooptic interferometer comprising first and second waveguide arms. The sideband generator is driven with an electrical drive signal at a control voltage that is substantially larger than $V_\pi$ to generate optical frequency sidebands about a carrier frequency of the optical signal. The optical frequency sidebands and the optical carrier frequency are discriminated to generate an optical millimeter wave signal. The phase of the electrical drive signal is altered in response to an encoded data signal representing a digital data input such that encoded alterations in the phase of the electrical drive signal are manifested as encoded alterations in the phase of the optical millimeter wave signal, creating an encoded representation of the digital data input in the optical millimeter wave signal. The method may further comprise a step of altering the amplitude of the optical millimeter wave signal in further response to the encoded data signal such that encoded alterations in the amplitude of the optical millimeter wave signal create a further encoded representation of the digital data input in the optical millimeter wave signal.

Figure 2:
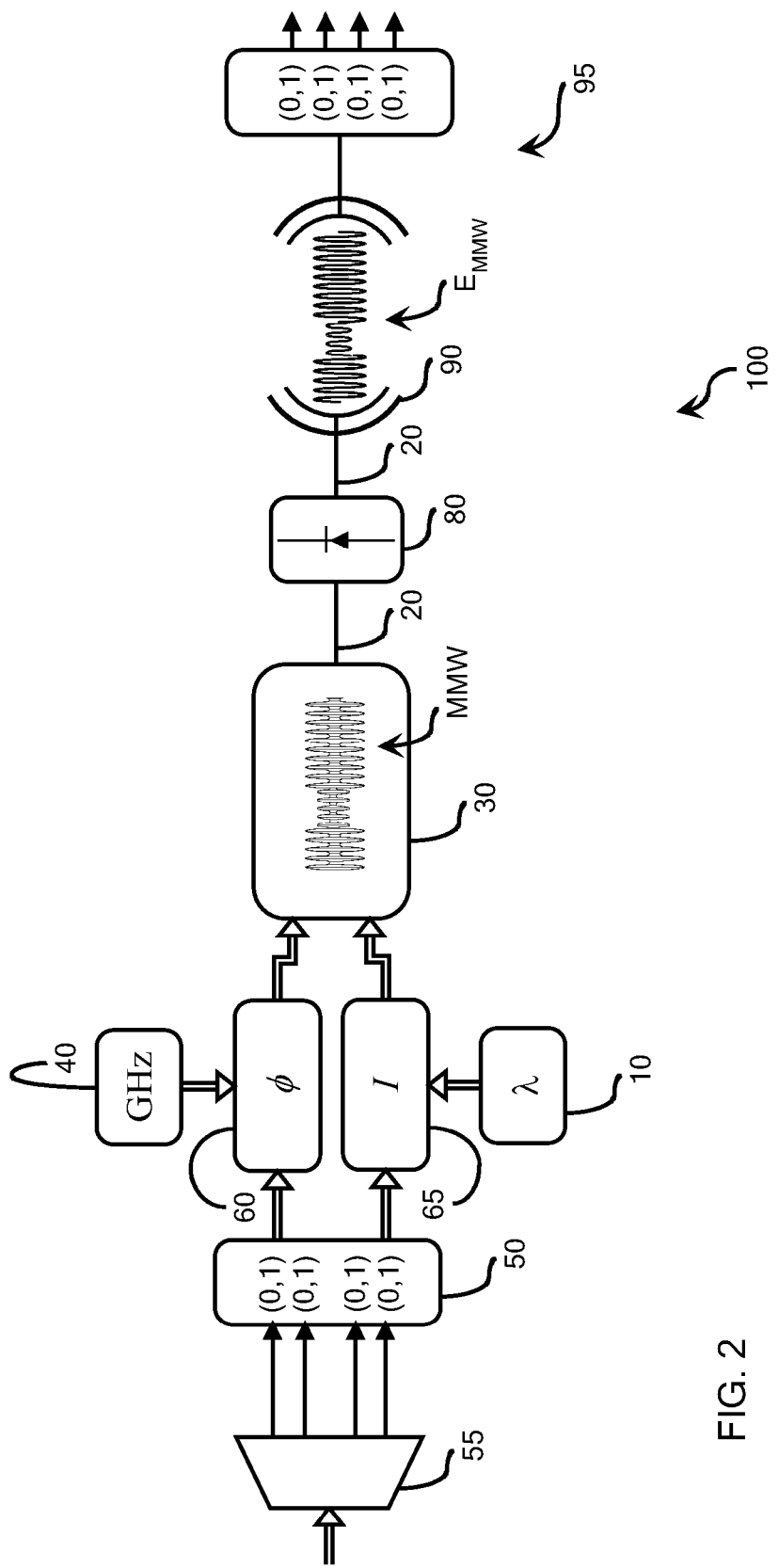

The following detailed description of specific embodiments of the present disclosure can be best understood when read in conjunction with the following drawings, where like structure is indicated with like reference numerals and in which:

FIG. 1 is a schematic illustration of a digital data transmission device according to one embodiment of the present disclosure; and FIG. 2 is a schematic illustration of a digital data transmission device according to another embodiment of the present disclosure.

Published United States Patent Application US 2008/0199124 ("Optical Device for Generating and Modulating THz and Other High Frequency Signals") presents a detailed illustration of the manner in which an electrooptic interferometer can be configured to generate a series of optical frequency sidebands about a carrier frequency of an optical signal. In general, a modulation controller generates an electrical drive signal that drives the sideband generator at a control voltage that is substantially larger than $V_\pi$ to generate the optical frequency sidebands. $V_\pi$ represents the voltage at which a $\pi$ phase shift is induced between respective arms of the interferometer. The reference also describes the manner in which an optical filter can be configured to direct optical sidebands of interest through an optical waveguide architecture as an optical millimeter wave signal that can be encoded to carry data.

As is noted above, the present disclosure relates to the use of a sideband generator similar to that described in the aforementioned published US patent application to impart phase modulation onto a millimeter-wave carrier in an effort to increase spectral efficiency of digital data transmission. To understand how phase modulation appears on the sidebands, the phase of the electrical drive signal $\phi_e$ can be tracked in the mathematical relationship of a modulated optical signal. Specifically, the optical signal output of a Mach-Zehnder Interferometer Modulator is given by:

$$E_I(t) = E_o \cos\left\{\frac{\phi_{DC}}{2} + \beta_i \sin[\omega_e t + \phi_e(t)]\right\} \cdot \cos[\omega_o t + \phi_o(t)] \quad (1)$$

where $\phi_{DC}$ is the constant phase shift due to the DC bias of the modulator, $\omega_o$ and $\phi_o(t)$ are associated with the optical frequency and $\omega_e$ and $\phi_e(t)$ are associated with the modulation frequency $f_e$ (i.e. $\omega_e = 2\pi f_e$). The modulation index $\beta_i$ is given by:

$$\beta_i = \frac{\pi}{V_{\pi i}} \cdot \frac{V_e}{2}$$

Using the identity $$\cos(\alpha+\beta) = \cos\alpha\cos\beta - \sin\alpha\sin\beta$$

the optical signal represented by Equation (1) can be represented as follows in Equation (2):

$$E_I(t) = E_o \cos\left[\frac{\phi_{DC}}{2}\right] \cos[\beta_i \sin(\omega_e t + \phi_e(t))] \cdot \cos[\omega_o t + \phi_o(t)] -$$
$$E_o \sin\left[\frac{\phi_{DC}}{2}\right] \sin[\beta_i \sin(\omega_e t + \phi_e(t))] \cdot \cos[\omega_o t + \phi_o(t)]$$

Using the Bessel function expansions $$\cos(\delta \sin(\omega_m t)) = J_0(\delta) + 2J_2(\delta)\cos(2\omega_m) + 2J_4(\delta)\cos(4\omega_m) + \ldots$$

and $$\sin(\delta \sin(\omega_m t)) = 2J_1(\delta)\sin(\omega_m) + 2J_3(\delta)\sin(3\omega_m) + \ldots$$

Equation (2) becomes:

$$E_I(t) = E_o \cos\left[\frac{\phi_{DC}}{2}\right] \quad (3)$$
$$\{J_0(\beta_i) + 2J_2(\beta_i)\cos[2(\omega_e t + \phi_e(t))] + 2J_4(\beta_i)\cos[4(\omega_e t + \phi_e(t))] +$$
$$\ldots\} \cdot \cos[\omega_o t + \phi_o(t)] - E_o \sin\left[\frac{\phi_{DC}}{2}\right]$$
$$\{2J_1(\beta_i)\sin[(\omega_e t + \phi_e(t))] + 2J_3(\beta_i)\sin[3(\omega_e t + \phi_e(t))] + \ldots\} \cdot$$
$$\cos[\omega_o t + \phi_o(t)]$$

Equation (3) becomes:

$$E_I(t) = E_o \cos\left[\frac{\phi_{DC}}{2}\right]\{J_0(\beta_i)\} \cdot \cos[\omega_o t + \phi_o(t)] + E_o \cos\left[\frac{\phi_{DC}}{2}\right] \quad (4)$$
$$\{2J_2(\beta_i)\cos[2(\omega_e t + \phi_e(t))] + 2J_4(\beta_i)\cos[4(\omega_e t + \phi_e(t))] + \ldots\} \cdot$$
$$\cos[\omega_o t + \phi_o(t)] - E_o \sin\left[\frac{\phi_{DC}}{2}\right]$$
$$\{2J_1(\beta_i)\sin[(\omega_e t + \phi_e(t))] + 2J_3(\beta_i)\sin[3(\omega_e t + \phi_e(t))] + \ldots\} \cdot$$
$$\cos[\omega_o t + \phi_o(t)]$$

Using the the trig identities $$\sin\alpha\sin\beta = \frac{1}{2}\cos(\alpha - \beta) - \frac{1}{2}\cos(\alpha + \beta)$$
$$\cos\alpha\cos\beta = \frac{1}{2}\cos(\alpha - \beta) + \frac{1}{2}\cos(\alpha + \beta)$$
$$\sin\alpha\cos\beta = \frac{1}{2}\sin(\alpha + \beta) + \frac{1}{2}\sin(\alpha - \beta)$$
$$\cos\alpha\sin\beta = \frac{1}{2}\sin(\alpha + \beta) - \frac{1}{2}\sin(\alpha - \beta)$$

the output of the optical modulator can be written as:

$$E_I(t) = E_o \cos\left[\frac{\phi_{DC}}{2}\right]\{J_0(\beta_i)\} \cdot \cos[\omega_o t + \phi_o(t)] + + \quad (5)$$
$$E_o \cos\left[\frac{\phi_{DC}}{2}\right] J_2(\beta_i)\{\cos(-2\omega_e t - 2\phi_e(t) + \omega_o t + \phi_o(t)) +$$
$$\cos(2\omega_e t + 2\phi_e(t) + \omega_o t + \phi_o(t))\} + +$$
$$E_o \cos\left[\frac{\phi_{DC}}{2}\right] J_4(\beta_i)\{\cos(-4\omega_e t - 4\phi_e(t) + \omega_o t + \phi_o(t)) +$$
$$\cos(4\omega_e t + 4\phi_e(t) + \omega_o t + \phi_o(t))\} + \ldots +$$
$$E_o \sin\left[\frac{\phi_{DC}}{2}\right] J_1(\beta_i)\{\sin(\omega_e t + \phi_e(t) + \omega_o t + \phi_o(t)) +$$
$$\sin(-\omega_e t - \phi_e(t) + \omega_o t + \phi_o(t))\} + +$$

-continued $$E_o \sin\left[\frac{\phi_{DC}}{2}\right] J_3(\beta_i)\{\sin(3\omega_e t + 3\phi_e(t) + \omega_o t + \phi_o(t)) +$$
$$\sin(-3\omega_e t - 3\phi_e(t) + \omega_o t + \phi_o(t))\} + +$$
$$E_o \sin\left[\frac{\phi_{DC}}{2}\right] J_5(\beta_i)\{\sin(5\omega_e t + 5\phi_e(t) +$$
$$\omega_o t + \phi_o(t)) + \sin(-5\omega_e t -$$
$$5\phi_e(t) + \omega_o t + \phi_o(t))\} + \ldots$$

Equation (5) describes the optical carrier and the various generated sidebands. The top line of Equation (5) is the optical carrier signal at a frequency of $\omega_o$. The amplitude of the carrier frequency is determined by the amplitude of the drive frequency ($V_e$) which is included in the factor $\beta_i$ in the Bessel function $J_0$, and by the DC bias on the Mach-Zehnder interferometer, which sets the fixed phase difference $\phi_{DC}$. The second and third lines show the +/− even sidebands with the optical frequencies ($\omega_o +/- 2\omega_e$), and ($\omega_o +/- 4\omega_e$), respectively. Ideally there are an infinite number of even sidebands, but from a practical standpoint, only the first few have sufficient optical power to use in this system. The fourth, fifth and sixth line in Equation (5) represent the odd sidebands with optical frequencies of ($\omega_o +/- \omega_e$), ($\omega_o +/- 3\omega_e$), and ($\omega_o +/- 5\omega_e$). Again, the magnitude of each of these sidebands is controlled by the amplitude of the electrical drive signal and the bias on the Mach-Zehnder Interferometer. Note that the bias of the Mach Zehnder can be controlled to emphasize the even sidebands ($\phi_{DC}=0$), or the odd sidebands ($\phi_{DC}=\pi$).

For this derivation, it is important to note that the phase of the electrical drive signal $\phi_e$ is present in each of the terms in Equation (5). As such, this phase term becomes part of the millimeter-wave phase and can be used to provide phase modulation of the millimeter-wave signal. If we use an optical filter to eliminate all but the desired sidebands, Equation (5) will be simplified. As an example, if we use an optical filter to eliminate the carrier and all but the +/−3$^{rd}$ harmonic, the optical signal can be represented by:

$$E_I(t) = E_o \sin\left[\frac{\phi_{DC}}{2}\right] J_3(\beta_i)\{\sin(3\omega_e t + 3\phi_e(t) + \omega_o t + \phi_o(t)) + \tag{6}$$
$$\sin(-3\omega_e t - 3\phi_e(t) + \omega_o t + \phi_o(t))\}$$

If this optical signal is detected by a sufficiently high frequency photodiode, then the output of the photodiode will envelop the modulated optical signal and be given by:

$$V_{out}(t) = C_1 J_3^2(\beta_i)\{\sin(2 \cdot 3\omega_e t + 2 \cdot 3\phi_e(t))\} \tag{7}$$

where $C_1$ is a constant related to the responsiveness of the photodiode, the bias on the interferometer and the electrical drive voltage. Note that the frequency of the millimeter-wave signal is 2×N$\omega_e$, where N is the sideband number. A typical example is to use a drive frequency of $f_e=15.6$ GHz ($\omega_e=2\pi f_e$) to achieve a resulting millimeter-wave frequency of 93.6 GHz. However, with this more detailed derivation, it is clear that the phase of the millimeter-wave signal is directly controlled by the phase of the electrical drive signal.

In practice, referring to FIG. 1, a digital data transmission device 100 according to the present disclosure will typically comprise a laser source 10, optical waveguide architecture 20, a sideband generator 30, a modulation controller 40, a data mapping unit 50, a phase controller 60, an optical filter 70, an optical amplifier 75, an optical/electrical converter 80, and an electromagnetic transmitting antenna 90, although variations on this general structure are contemplated.

Generally, the optical waveguide architecture comprises a combination of waveguides and optical fibers that are configured to direct optical signals throughout the transmission device. Specifically, the waveguide architecture is configured to direct the optical carrier and associated sidebands from the laser source 10 to the sideband generator 30, optical filter 70, and optical amplifier 75.

The sideband generator 30 comprises an electrooptic interferometer with first and second waveguide arms, e.g., a Mach-Zehnder interferometer, the structure and function of which is presented in detail in US 2008/0199124. The modulation controller 40 cooperates with the sideband generator 30 and is configured to generate an electrical drive signal that drives the sideband generator 30 at a control voltage that is substantially larger than $V_\pi$ to generate optical frequency sidebands about the carrier frequency of the optical signal. As is noted in US 2008/0199124, $V_\pi$ represents the voltage at which a $\pi$ phase shift is induced between respective arms of the interferometer. The optical filter 70 discriminates between the optical frequency sidebands and the optical carrier frequency such that optical sidebands of interest can be directed through the optical waveguide architecture 20 as an optical millimeter wave signal MMW.

The data mapping unit 50 is configured to generate an encoded data signal representing a digital data input received by the data mapping unit 50. The phase controller 60 is responsive to the data mapping unit 50 and is configured to alter the phase of the electrical drive signal in response to the encoded data signal generated by the data mapping unit 50. In this manner, the phase encoding of the electrical drive signal embodies a direct representation of the digital data input and the sideband generator 30 can be configured such that encoded alterations in the phase of the electrical drive signal are manifested as encoded alterations in the phase of the optical millimeter wave signal MMW. As a result, a phase-encoded representation of the digital data input can be created in the optical millimeter wave signal and the optical/electrical converter 80 can be configured to convert the encoded optical millimeter wave signal MMW to an encoded electrical millimeter wave signal $E_{MMW}$ for transfer to the electromagnetic transmitting antenna 90.

In the embodiment illustrated in FIG. 1, the encoded data signal generated by the data mapping unit 50 can represent a 2-bit code and the phase controller 60 can be configured to alter the phase of the electrical drive signal among four available electrical phase values corresponding to the bit sequence of the 2-bit code:

TABLE 1

| Bit Sequence | Phase of the Electrical Drive Signal | Phase of the Millimeter-wave Signal |
| --- | --- | --- |
| 00 | 0° | 0° |
| 01 | 15° | 90° |
| 10 | 30° | 180° |
| 11 | 45° | 270° |

As is illustrated in Table 1, the phase of the resulting millimeter-wave signal MMW can be a direct multiple of the phase of the electrical drive signal. More generally, where the encoded data signal generated by the data mapping unit represents an n-bit code, it is contemplated that the phase controller can be configured to alter the phase of the electrical drive signal among $n^2$ available electrical phase values corresponding to the bit sequence of the n-bit code.

Referring to FIG. 2, where like reference numerals are used to indicate like structure, it is noted that the present disclosure further contemplates architecture and methodology for phase and amplitude encoding of the millimeter-wave signal MMW. Specifically, the digital data transmission device 100' may further comprise an amplitude controller 65 that is configured to alter the amplitude of the optical millimeter wave signal MMW in further response to the encoded data signal generated by the data mapping unit 50 upon receipt of demultiplexed digital data via demultiplexer 55. In this manner, encoded alterations in the amplitude of the optical millimeter wave signal MMW can be used to create further enhancements to spectral efficiency in the optical millimeter wave signal MMW. The amplitude controller 65 may comprise any suitable device for altering the amplitude of an optical signal and may, for example, be presented as an electrooptic interferometer positioned upstream or downstream of the electrooptic interferometer used for the sideband generator 30.

In the embodiment illustrated in FIG. 2, the encoded data signal generated by the data mapping unit 50 represents a 4-bit code. The phase controller 60 and the amplitude controller 65 are configured to alter the phase of the electrical drive signal and the amplitude of the optical millimeter wave signal among a set of sixteen available phase and non-zero amplitude values corresponding to the bit sequence of the 4-bit code, an example of which is illustrated in Table 2, where the set of sixteen available phase and amplitude values is defined by eight available phase values and two non-zero amplitude values:

| Data | Phase | Amplitude |
|------|-------|-----------|
| 0000 | 0 | 1 |
| 0001 | π/4 | 1 |
| 0010 | π/2 | 1 |
| 0011 | 3π/4 | 1 |
| 0100 | π | 1 |
| 0101 | 5π/4 | 1 |
| 0110 | 3π/2 | 1 |
| 0111 | 7π/4 | 1 |
| 1000 | 0 | 3 |
| 1001 | π/4 | 3 |
| 1010 | π/2 | 3 |
| 1011 | 3π/4 | 3 |
| 1100 | π | 3 |
| 1101 | 5π/4 | 3 |
| 1110 | 3π/2 | 3 |
| 1111 | 7π/4 | 3 |

More generally, where the encoded data signal generated by the data mapping unit represents an n-bit code, the phase controller and the amplitude controller can be are configured to alter the phase of the electrical drive signal and the amplitude of the optical millimeter wave signal among $n^2$ available phase and amplitude values corresponding to the bit sequence of the n-bit code. Preferably, the set of $n^2$ available phase and amplitude values is defined by at least $n^2/4$ and as many as $n^2/2$ available phase values and at least $n^2/8$ and as many as $n^2/4$ non-zero amplitude values. For example, in the case of the 4-bit code illustrated above, it is contemplated that the set of sixteen available phase and amplitude values would preferably be defined by at least four and as many as eight available phase values and at least two and as many as four non-zero amplitude values.

FIG. 2 also presents a schematic representation of the case where the digital data transmission device 100 further comprises a millimeter wave receiver 95 that is positioned to receive the encoded electrical millimeter wave signal $E_{MMW}$ transmitted by the electromagnetic transmitting antenna 90. For example, the millimeter wave receiver 95 typically comprises an electromagnetic receiving antenna, a phase shift detector, and a data recovery unit configured to receive and decode the encoded electrical millimeter wave signal. The phase shift detector can be presented in any conventional or yet-to-be developed configuration. For example, it is contemplated that the phase shift detector may comprise a phase-locked loop where a local oscillator is phase-locked to the carrier frequency of the incoming signal and the phase of the local oscillator and the phase of the incoming signal are compared to detect the phase shift.

It is noted that recitations herein of a component of the present disclosure being "configured" in a particular way, "configured" to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase.

The invention claimed is:

1. A digital data transmission device comprising optical waveguide architecture, a sideband generator, a modulation controller, an optical filter, a data mapping unit, and a phase controller, wherein:

the optical waveguide architecture is configured to direct an optical signal through the sideband generator and the optical filter;

the sideband generator comprises an electrooptic interferometer comprising first and second waveguide arms;

the modulation controller is configured to generate an electrical drive signal to drive the sideband generator at a control voltage that is substantially larger than $V_\pi$ to generate optical frequency sidebands about a carrier frequency of the optical signal, where $V_\pi$ represents the voltage at which a $\pi$ phase shift is induced between respective arms of the interferometer;

the optical filter is configured to discriminate between the optical frequency sidebands and the optical carrier frequency such that optical sidebands of interest can be directed through the optical waveguide architecture as an optical millimeter wave signal;

the data mapping unit is configured to generate an encoded data signal representing a digital data input received by the data mapping unit;

the phase controller is configured to alter the phase of the electrical drive signal in response to the encoded data signal generated by the data mapping unit;

the sideband generator is configured such that encoded alterations in the phase of the electrical drive signal are manifested as encoded alterations in the phase of the optical millimeter wave signal, creating an encoded representation of the digital data input in the optical millimeter wave signal.

2. A device as claimed in claim 1 wherein
the encoded data signal generated by the data mapping unit represents a 2-bit code; and
the phase controller is configured to alter the phase of the electrical drive signal among four available electrical phase values corresponding to the bit sequence of the 2-bit code.

3. A device as claimed in claim 1 wherein
the encoded data signal generated by the data mapping unit represents an n-bit code; and
the phase controller is configured to alter the phase of the electrical drive signal among $n^2$ available electrical phase values corresponding to the bit sequence of the n-bit code.

4. A device as claimed in claim 3 wherein the phase of the optical millimeter wave signal is a multiple of the phase of the electrical drive signal.

5. A device as claimed in claim 1 wherein the digital data transmission device further comprises an amplitude controller configured to alter the amplitude of the optical millimeter wave signal in further response to the encoded data signal generated by the data mapping unit, such that encoded alterations in the amplitude of the optical millimeter wave signal create a further encoded representation of the digital data input in the optical millimeter wave signal.

6. A device as claimed in claim 5 wherein the amplitude controller comprises an electrooptic interferometer.

7. A device as claimed in claim 5 wherein the amplitude controller is positioned upstream or downstream of the electrooptic interferometer of the sideband generator.

8. A device as claimed in claim 5 wherein
the encoded data signal generated by the data mapping unit represents a 4-bit code; and
the phase controller and the amplitude controller are configured to alter the phase of the electrical drive signal and the amplitude of the optical millimeter wave signal among a set of sixteen available phase and non-zero amplitude values corresponding to the bit sequence of the 4-bit code.

9. A device as claimed in claim 8 wherein the set of sixteen available phase and amplitude values is defined by eight available phase values and two non-zero amplitude values.

10. A device as claimed in claim 8 wherein the set of sixteen available phase and amplitude values is defined by at least four and as many as eight available phase values and at least two and as many as four non-zero amplitude values.

11. A device as claimed in claim 5 wherein
the encoded data signal generated by the data mapping unit represents an n-bit code; and
the phase controller and the amplitude controller are configured to alter the phase of the electrical drive signal and the amplitude of the optical millimeter wave signal among $n^2$ available phase and amplitude values corresponding to the bit sequence of the n-bit code.

12. A device as claimed in claim 11 wherein the set of $n^2$ available phase and amplitude values is defined by at least $n^2/4$ and as many as $n^2/2$ available phase values and at least $n^2/8$ and as many as $n^2/4$ non-zero amplitude values.

13. A device as claimed in claim 11 wherein the set of $n^2$ available phase and amplitude values is defined by more available phase values than non-zero amplitude values.

14. A device as claimed in claim 1 wherein:
the digital data transmission device further comprises an optical/electrical converter and an electromagnetic transmitting antenna; and
the optical/electrical converter is configured to convert the encoded optical millimeter wave signal to an encoded electrical millimeter wave signal and transfer the encoded electrical millimeter wave signal to the electromagnetic transmitting antenna.

15. A device as claimed in claim 14 wherein:
the digital data transmission device further comprises a millimeter wave receiver positioned to receive the encoded electrical millimeter wave signal transmitted by the electromagnetic transmitting antenna;
the millimeter wave receiver comprises an electromagnetic receiving antenna, a phase shift detector, and a data recovery unit configured to receive and decode the encoded electrical millimeter wave signal.

16. A device as claimed in claim 1 wherein the digital data transmission device further comprises a carrier signal laser source optically coupled to the waveguide architecture.

17. A method of transmitting digital data, wherein the method comprises:
directing an optical signal through a sideband generator comprising an electrooptic interferometer comprising first and second waveguide arms;
driving the sideband generator with an electrical drive signal at a control voltage that is substantially larger than $V_\pi$ to generate optical frequency sidebands about a carrier frequency of the optical signal, where $V_\pi$ represents the voltage at which a $\pi$ phase shift is induced between respective arms of the electrooptic interferometer;
discriminating between the optical frequency sidebands and the optical carrier frequency to generate an optical millimeter wave signal;
generating an encoded data signal representing a digital data input;
altering the phase of the electrical drive signal in response to the encoded data signal such that encoded alterations in the phase of the electrical drive signal are manifested as encoded alterations in the phase of the optical millimeter wave signal, creating an encoded representation of the digital data input in the optical millimeter wave signal.

18. A method as claimed in claim 17 wherein the method further comprises:
altering the amplitude of the optical millimeter wave signal in further response to the encoded data signal such that encoded alterations in the amplitude of the optical millimeter wave signal create a further encoded representation of the digital data input in the optical millimeter wave signal.

* * * * *